United States Patent [19]

Schneider et al.

[11] Patent Number: 4,965,455
[45] Date of Patent: Oct. 23, 1990

[54] X-RAY IMAGING FILM AND APPARATUS FOR HANDLING IT

[75] Inventors: Rudolf Schneider, Pfaffenhofen; Jürgen Müller, Munich; Volkmar Voigtländer, Eichenau, all of Fed. Rep. of Germany

[73] Assignee: AGFA-Gevaert AG, Leverkusen, Fed. Rep. of Germany

[21] Appl. No.: 320,777

[22] Filed: Mar. 8, 1989

[30] Foreign Application Priority Data

Mar. 25, 1988 [DE] Fed. Rep. of Germany ....... 3810094

[51] Int. Cl.$^5$ ...................... G01N 23/04; G03B 42/04
[52] U.S. Cl. ................................... 250/484.1; 378/187
[58] Field of Search ............................. 378/187, 188; 250/489.1, 327.2

[56] References Cited

U.S. PATENT DOCUMENTS

| 2,694,153 | 11/1954 | Reuter | 378/185 |
| 4,357,538 | 11/1982 | Hunt et al. | 378/175 |
| 4,499,381 | 2/1985 | Bauer | 250/483.1 |
| 4,582,989 | 4/1986 | Agano | 250/347 |

FOREIGN PATENT DOCUMENTS 98596 1/1984 European Pat. Off. ...... 250/327.2 J

Primary Examiner—Carolyn E. Fields
Attorney, Agent, or Firm—Michael J. Striker

[57] ABSTRACT

An x-ray film has a flexible sheet having a front face and a rear face, a layer of an x-ray stimulable phosphor on the front face, and a layer of mangetically attractable material, for example a steel foil, on the rear face. This film is used with a film handling apparatus, normally a reader, having structure forming a flap support surface of a size at least equal to that of the film and at least one permanent magnet is imbedded in the structure and extends over the surface. Thus the rear face of the film can be adhered magnetically to the surface. An array of stripping elements is distributed over the surface and each element is displaceable through the surface between a recessed position below the surface and an advanced position projecting past the surface. An actuator can displace the elements from their withdrawn to their advanced position and thereby lift from the surface a film clinging magnetically to the surface.

32 Claims, 3 Drawing Sheets

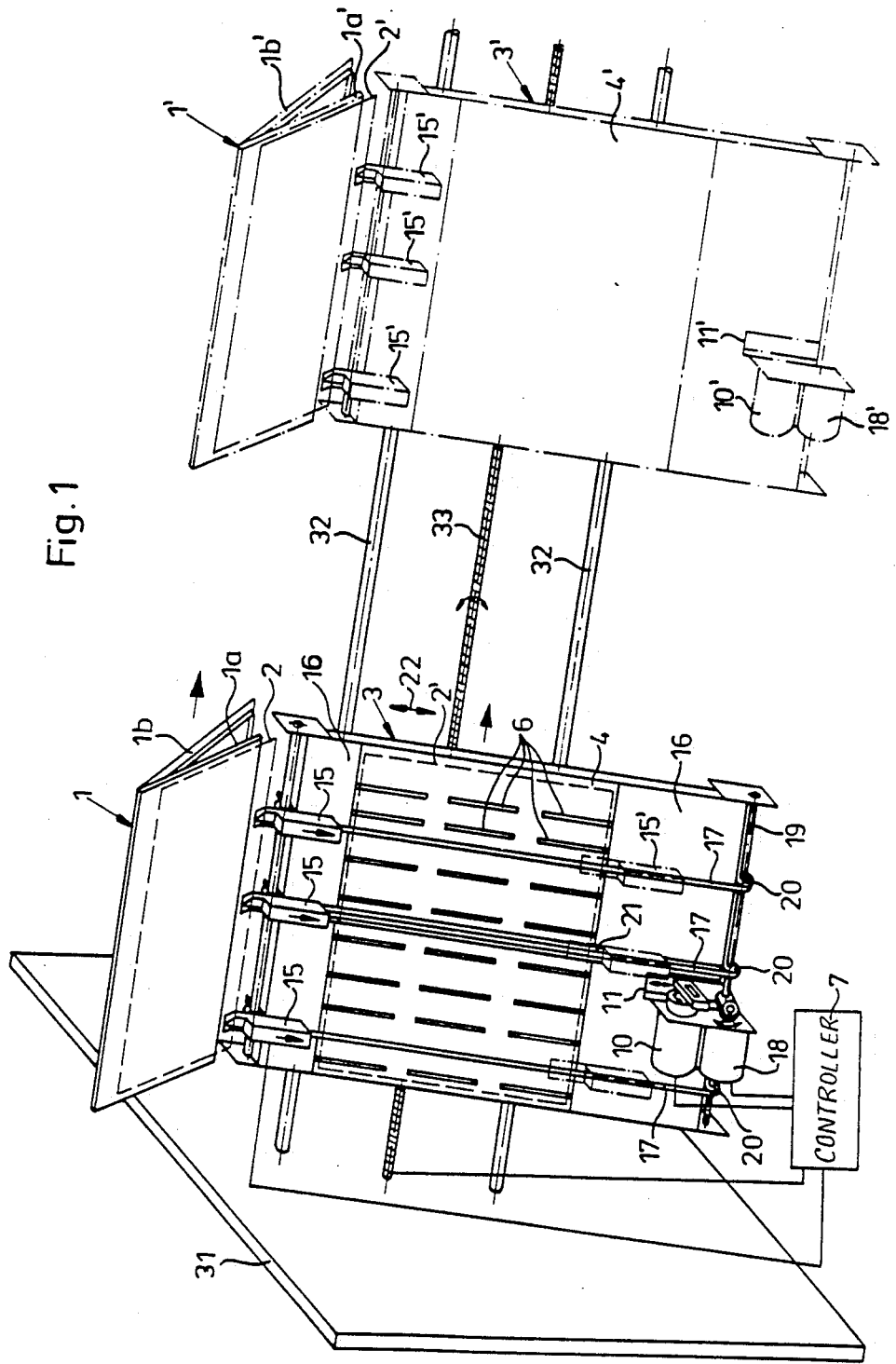

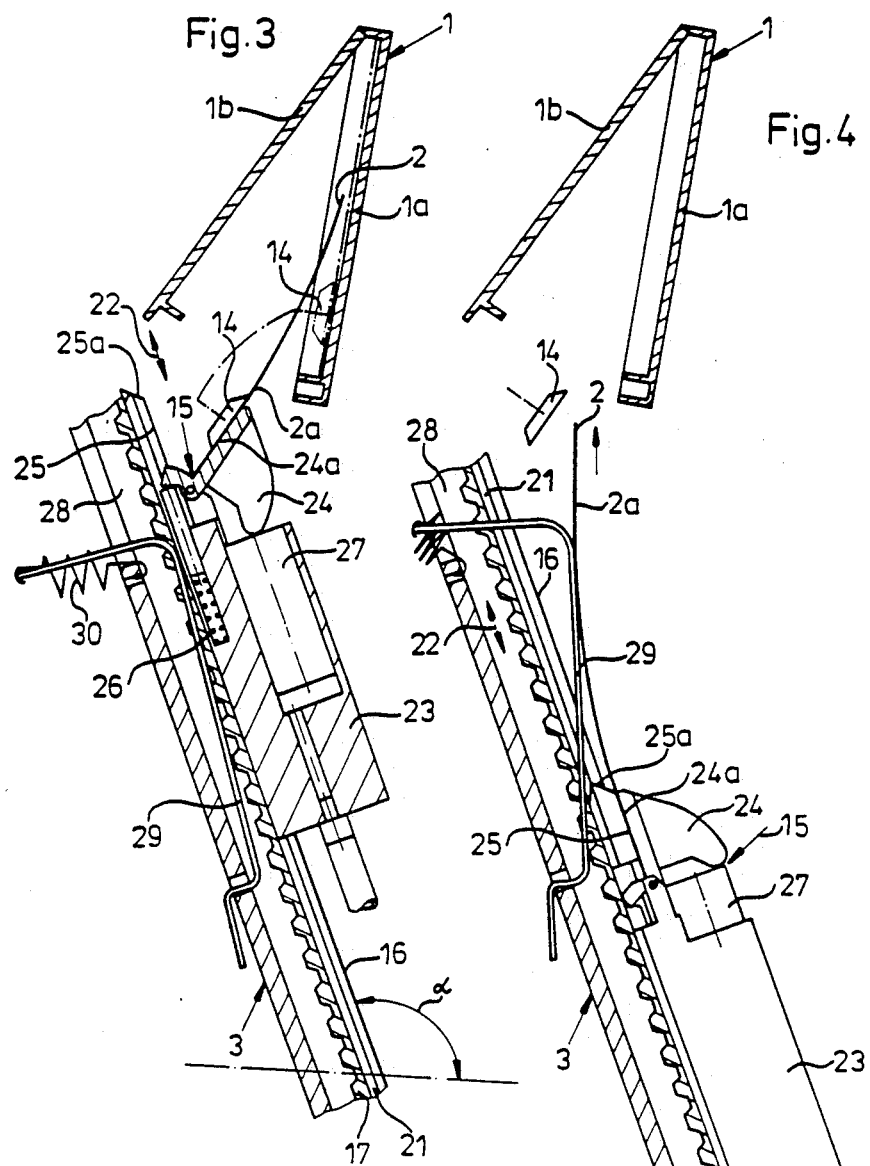
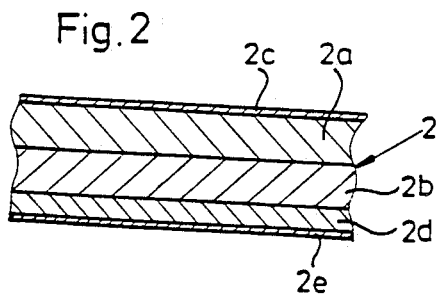

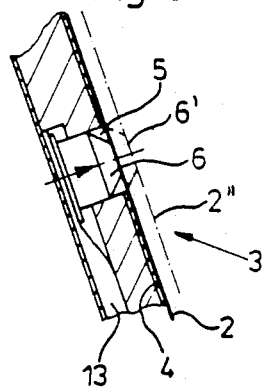
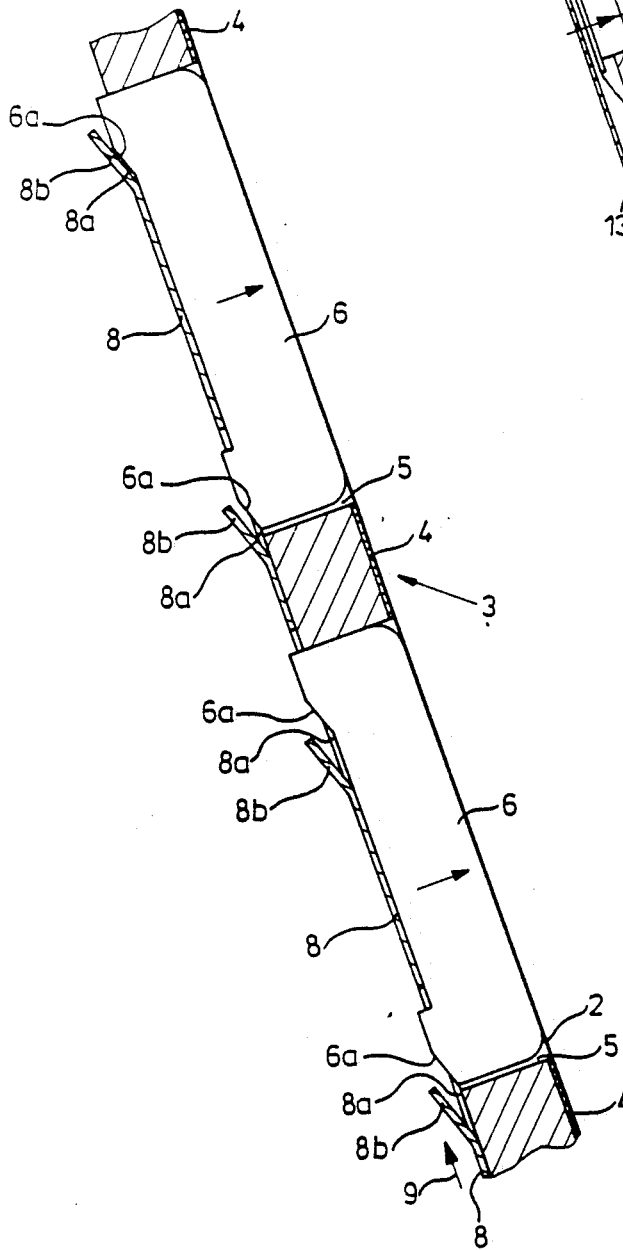
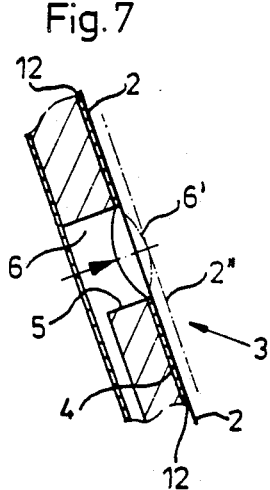

X-RAY IMAGING FILM AND APPARATUS FOR HANDLING IT

FIELD OF THE INVENTION

The present invention relates to an x-ray imaging film and an apparatus for handling it. More particularly this invention concerns an x-ray imaging system with a reusable image carrier sheet or film.

BACKGROUND OF THE INVENTION

A standard x-ray imaging film comprises a substrate foil or sheet typically made of a polyester or other durable synthetic resin and carrying a layer of a phosphor stimulable by x-ray radiation. Once exposed such a film is held in an apparatus that can read the exposure, usually using laser technology. Thereafter the phosphor is restored so that the film can be reused.

As a rule the x-ray film is held in a cassette which is transparent to x-radiation and in which it is exposed so that it carries a latent image. A reading device such as described in German patent document Nos. 3,731,203 and 3,731,204 can stimulate the phosphors to bring out the image which is then scanned and converted into digital signals that can be viewed on a monitor or converted into a viewable or printable image. The image is then erased and the film is put back into its cassette. It is normal also for the x-ray film sheet to also carry indicia identifying the patient, the exposure date, and the like, and this indicia is also read and then erased before reuse of the film.

Such a film is reusable, but must be handled substantially each time it is used. It must be taken out of its cassette, loaded into the reader, positioned therein on a handling station, and thereafter taken out of the reader and returned to its cassette. Invariably the sensitive phosphor face of the film is touched and, inevitably, worn and scratched.

Even though the systems of the above-cited patent documents use a cassette to hold the film sheet except when it is in the reader, the film is subjected to considerable mechanical action as it is taken from and put back into the cassette. Thus it is standard to only reuse such a valuable x-ray film 2000 to 3000 times. After this much use the phosphors still have sufficient life for many more uses, but the phosphor side of the film is too scratched or otherwise mechanically damaged for reuse.

OBJECTS OF THE INVENTION

It is therefore an object of the present invention to provide an improved x-ray film and handling apparatus.

Another object is the provision of such an improved x-ray film and handling apparatus which overcome the above-given disadvantages, that is which allows the x-ray film to be reused to an extent impossible with the prior-art such films because mainly of gentle handling which avoids mechanically damaging the film.

SUMMARY OF THE INVENTION

An x-ray film according to this invention has a flexible sheet having a front face and a rear face, a layer of an x-ray stimulable phosphor on the front face, and a layer of a magnetically attractable material, for example a steel foil, on the rear face. This film is used with a handling apparatus, normally a reader such as described in the above-cited German patent documents but having structure forming a flat support surface of a size at least equal to that of the film and at least one permanent magnet is imbedded in the structure and extends over the surface. Thus the rear face of the film can be adhered magnetically to the surface.

According to this invention an array of stripping elements is distributed over the surface and each element is displaceable through the surface between a recessed position below the surface and an advanced position projecting past the surface. An actuator can displace the elements from their withdrawn to their advanced positions and thereby lift from the surface a film clinging magnetically to the surface.

The provision of a magnetically attractable layer on the back of the film and a permanently magnetic support surface means that, once the film is in position on the surface, it will remain flatly in place without the agency of the standard holding clips that engage around it on all edges, in contact with the delicate phosphor-coated front face of the film. This means not only that this front surface will not be damaged by the holding clips, but also that the entire area of the film is available for the image and patient- and/or institution-identifying indicia. In fact the film according to this invention can normally be used as many at 10,000 times, many times more than any prior-art film.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is a partly diagrammatic perspective view of the film-handling system according to this invention;

FIG. 2 is a large-scale section, not to scale, of the film of this invention;

FIGS. 3 and 4 are vertical sections through a portion of the apparatus during loading and unloading operations, respectively;

FIG. 5 is a large-scale vertical section, not to scale, through a detail of the apparatus of FIGS. 1, 3, and 4; and FIGS. 6 and 7 are views corresponding to details of FIG. 5 of alternative systems of this invention.

SPECIFIC DESCRIPTION

As seen in FIG. 2 the instant invention includes a x-ray film 2 comprised of a stimulable phosphor layer 2a on the front face of a polyester sheet 2b whose back face carries a layer 2d formed by a mild-steel sheet. The front layer 2a is covered by a protective layer 2c and the back layer 2d by another such layer 2e, the former of which at least is transparent to x-radiation.

Such a film 2 is normally held as seen in FIGS. 1, 3, and 4 in a cassette 1 having a back panel 1a and a front panel 1b that are hinged together along one edge. The film 2 is oriented with its phosphor layer 2a turned toward the back panel 1a which itself is turned toward the object being x-rayed, the source of x-radiation being on the opposite side of this object. Thus the machine operators and so on merely handle the cassette 1 which is a durable item that effectively and surely protects the film 2. The film 2 of this invention is, however, handled with so little damage by the automatic reading and restoring equipment that it is even possible to use it without the cassette, loading it directly into the film magazine of the x-ray machine.

Typically the exposed film is stimulated, read and restored in a reader apparatus of the type described in the above-cited German patent documents whose housing is shown in FIG. 1 at 31. This reader apparatus is provided with a reading station 3 formed by a planar bed plate 16 having a central surface region 4 which is permanently magnetized, either by implantation of an array of small magnets or by being formed of a large magnetic plate set in the plate 16. Either way the magnetic region 4 is of a size slightly larger than that of the largest film 2 that the machine 31 is set up to handle. The entire plate 16 can be moved between a loading position shown in solid lines in FIG. 1 to a position shown in dot-dash lines and with all reference numerals primed by sliding along two horizontal guide rods 32, driven by a screw 33 operated by a controller 7.

It is standard to move the film 2 along parallel to the plane of the surface 4 before allowing it to cling magnetically thereto. To allow this, the station 3 is formed with a plurality of apertures (see FIG. 5) uniformly distributed over the surface 4 and each provided with a stripper element 6. These elements 6 can be moved from a position lying beneath the plane of the surface 4 to a position projecting slightly thereabove, it being understood that the surface is directed at least generally upward, here extending at 110° to the horizontal.

As seen in FIG. 5 these stripper elements 6 can be individual bars having rear surfaces formed with inclined camming edges 6a. A common actuator bar 8 is formed with cutouts 8a accommodating the edges 6a and formed in part by camming tabs 8b that can flatly engage these edges 6a. Shifting the plate 8 in the direction indicated by arrow 9 of FIG. 5 will push the elements 6 out as indicated by arrows. When these elements 6 project above the surface of the magnetized region 4, the film 2 can be slid into position on this surface 4 without clinging to it. The fact that the surface 4 is directed mainly upward ensures that the stripper elements 6 will drop back to their below-surface retracted positions by gravity.

As seen in FIG. 1 a motor 10 can drive a rack 11 secured to or formed on the plate 8 to move it between its end positions corresponding to the advanced and retracted position of the stripper elements 6. In addition in this system it is noted that the cam tabs 8b are spaced somewhat differently from the stripper elements 6 so that same are not all lifted or lowered simultaneously; instead the stripper elements 6 under top and/or bottom edges are retracted last and advanced first so that the film starts to cling in its center and is separated at its edges first. Similarly the elements 6 at the sides could be set to work first.

It is also possible as shown in FIG. 6 to form pushers 6a as individual pistons and to form a plenum 13 behind them so that the pistons 6a can be moved out to the alternate position shown at 6a' where they hold the film 2 as shown by 2''. Similarly in FIG. 7, stripper elements 6b are formed by a flexible membrane 12 overlying the surface 4. Pressurization of the area behind the membrane 12, which is adhered between the apertures 5 to the surface 4, forces the membrane 12 out as bumps 6b which also hold the film 2 at position 2'' off the surface 4. Evacuation of the area behind the plate 16 will similarly draw the membrane 12 back into the holes 5 and allow the film 2 to lie flat against the surface 4. The sliding of the plate 8 of FIG. 5 or the pressurization or depressurization of the systems of FIGS. 6 and 7 are controlled by the control means 7.

As seen in FIGS. 1, 3, and 4, the plate 16 is formed with a film transporting device including three parallel grooves 21 in each of which runs one stretch of a toothed belt 17 reeved at the lower end of the plate 16 over a respective toothed wheel 20 fixed to a shaft operated by a servomotor 18 in turn operated by the controller 7. These belts 17 each carry a clip 15 having a clip body 23 slidable as shown by arrow 22 in the respective groove 21 and carrying a stationary rear jaw 25 and a displaceable front jaw 24 having respective flat surfaces between which the film 2 can be gripped. The front jaw 24 is pivotal on the clip body 23 and is urged into an open position shown in FIG. 3 by a spring 26, and in this open position has its surface 24a at the correct angle to receive a film passed to it from an open cassette 1 by a suction-type gripper 14 also operated by the controller 7. In addition this jaw 24 can be moved into the closed position by a pneumatic piston 27 also operated by the controller 7. The rear jaw 25 which is unitarily formed with the body 23 has a front edge 25a extending at an acute angle to and across the plane of the surface 4 so that this jaw 25 can slide under a film 2 thereon as described below:

In addition as shown in FIGS. 3 and 4 the upper end 28 of each groove 21 houses a wire bow 29 that can be depressed by the respective clip body 23 as shown in FIG. 3 into a position lying wholly beneath the surface 4 but that is urged by a spring 30 into a position extending up and at an angle to the plane of this surface 4.

The system described above operates as follows:

To start with, a cassette 1 containing an exposed film 2 is opened somewhat and set in the position of FIGS. 1, 3, and 4, to which end an appropriate holder or seat is provided on the reader apparatus whose housing is shown at 31. The controller 7 operates the motor 18 to move the clips 15 to the top of the plate 16, pushes out the stripper elements 6, and pressurizes the pistons 27 to open the clips 15.

Then the suction grippers 14 are displaced as indicated by dot-dash lines in FIG. 3 against the back face of the film 2 and are pulled down to press the front face of this film 2 at its lower edge against the faces 24a of the retracted front jaws 24. Thereupon the grippers 14 move out of the way and the jaws 24 close, gripping the lower film edge between the surfaces 24 and the rear jaws 25.

The motor 18 is then operated to move down the clips 15 on the upper stretches of the belts 17 and simultaneously pull the film 2 down out of the cassette 1. Gravity causes the film 2 to lie against the extended stripper elements 6 so that it is held out of contact with the magnetic region. It can slide easily on these extended strippers with no significant damage to itself.

Once the film 2 is in the desired position the motor 10 is operated by the controller 7 to retract the stripper elements 6 so that the film 2 clings starting from the middle up and down to the surface 4. The magnetic action ensures that the film 2 will lie perfectly flat on the surface 4.

The actuators 27 are then operated to open the clips 15 which are then pulled further down, completely out of contact with the film 2 and into the position indicated at 15'. This leaves the film 2 flat on the area 4 with absolutely nothing covering any portion of it. It can them be moved over as shown to the right in FIG. 1 and can be developed, scanned, read, or otherwise treated. All information on it, including any patient data inscribed at a corner or edge region, can easily be read from the film 2.

Once the film 2 has been finished with, and normally restored so that it can be reexposed, the clips 15 are moved back up, with their jaws 24 in the open position, until the lower edge of the film 2 rides up on the edges 25 and this edge lies between the jaws 24 and 25. The actuators 27 are then operated to grip this lower edge.

Once held in the clips 15, the motor 10 is actuated to advance the elements 6 and thereby push the film 2 up off the surface 4 and make it possible to slide it. Then the motor 18 is actuated to slide the film 2 up on the extended stripper elements 6.

Meanwhile an empty cassette 1 is in the holder in the same position it was in to take out the film 2, and the bows 29 have moved into the position of FIG. 4, projecting out across the plane of the surface 4. Thus the rising film 2 will be pushed up and across into the cassette 1 as it rides over these bows 29 which eventually are pushed back into place as the clips 15 reach their uppermost position.

Once all the way up, the jaws 24 are pulled back into the FIG. 3 position and the suction grippers 14 are moved down to engage the back face of the film 2 and pick this film 2 up and put it all the way back into the cassette 1, following the same path but in reverse as followed to take out the film 2. The cassette is then closed and entire exchange is over.

During this operation the only contact with the somewhat fragile front of the film 2 is by the flat faces 24a of the clips 15. This contact is not any type of sliding movement, however, so that it will not do any measurable damage even if repeated a great many times. The sliding of the rear of the film 2 over the stripper elements 6 does not hurt the delicate phosphor emulsion, and once the film is in position and clinging magnetically to the surface 4, nothing whatsoever is in contact with its front face.

Of course many variations on the illustrated equipment are possible. For instance the clips 15 could be held normally closed by springs and only opened by pneumatic actuators, and such reverse biasing of the stripper element 6 would also be possible. A roller feed could replace the suction grippers 14 and the toothed belts 17 could be replaced by V-belts, chains, or other appropriate elements, even worm or rack drives. The bed plate 16 could be perfectly horizontal or otherwise oriented.

What is claimed is:

1. In combination with an x-ray film formed of:
   a flexible sheet having a front face and a rear face;
   a layer of an x-ray stimulable phosphor on the front face; and
   a layer of a magnetically attractable material on the rear face;
   a film handling apparatus comprising:
   structure forming a flat support surface of a size at least equal to that of the film;
   at least one permanent magnet imbedded in the structure and extending over the surface, whereby the rear face of the film can be adhered magnetically to the surface;
   an array of stripping elements distributed over the surface and each displaceable through the surface between a recessed position below the surface and an advanced position projecting past the surface; and
   actuator means for displacing the elements from their recessed to their advanced position and thereby lifting from the surface a film clinging magnetically to the surface.

2. The combination defined in claim 1, further comprising
   transporting means including at least one clip having rear and front jaws closable on the respective faces at an edge of the film and displaceable along the surface for moving the film into a predetermined position on the surface.

3. The combination defined in claim 2 wherein the surface is substantially planar and at least generally upwardly directed.

4. The combination defined in claim 3 wherein the surface extends at an angle of about 110° to the horizontal.

5. The combination defined in claim 2, further comprising
   an openable flat film cassette capable of holding the film;
   the transporting means including a suction-type gripper engageable with the film in the cassette while same is opened and displaceable for transferring the film between the cassette and the at least one clip.

6. The combination defined in claim 5 wherein there are a plurality of such clips and for each clip there is a respective such gripper.

7. The combination defined in claim 2 wherein the transporting means includes:
   a flexible endless element carrying the at least one clip and
   drive means connected to the endless element for displacing same along the surface.

8. The combination defined in claim 7 wherein the endless element is a toothed belt and the drive means includes a toothed wheel over which the belt is reeved.

9. The combination defined in claim 8 wherein the at least one clip includes:
   spring means urging the jaws apart and out of a position gripping the edge of the film and
   fluid-powered actuator means for urging the jaws together and into the position gripping the edge of the film.

10. The combination defined in claim 11 wherein the structure includes a support plate having a planar face forming the surface and provided with the at least one permanent magnet, the plate being formed with a straight groove opening at the surface and forming a guide for the rear jaw of the at least one clip and for the endless element, the front jaw of the at least one clip being carried on the rear jaw and standing above the surface, the rear jaw being formed with a forward edge inclined at a sharp acute angle to the surface and extending across the plane of the surface.

11. The combination defined in claim 10, further comprising for positioning a film on the surface, control means connected to the drive and actuator means for sequentially:
    displacing the at least one clip while gripping the film and while the stripping elements are in the advanced position across the surface while sliding the film on the gripping elements until the film is in a predetermined position within the bounds of the at least one permanent magnet;

displacing the stripping elements into the recessed position when the film is in the position so that the magnetically attractable rear layer on the film clings to the at least one permanent magnet; and opening the at least one clip and thereafter displacing the at least one clip along the groove away from the film clinging magnetically to the surface.

12. The combination defined in claim 11, further comprising for removing a film from the surface, control means connected to the drive and actuator means for sequentially:

displacing the at least one clip with its jaws spaced apart toward the film clinging magnetically to the surface and closing the jaws on the film;

advancing the stripping elements to the advanced position and thereby lifting the film off the surface; and displacing the at least one clip with its jaws closed on the film edge along the surface with the stripping elements advanced to slide the film on the advanced elements from its position.

13. The combination defined in claim 2, further comprising an openable flat film cassette capable of holding the film;

the transporting means including a suction-type gripper engageable with the film in the cassette while same is opened and displaceable for transferring the film between the cassette and the at least one clip, the jaws being displaceable into an open position with the front jaw positioned to flatly receive the film from the gripper.

14. The combination defined in claim 2, further comprising:

an openable flat film cassette capable of holding the film, the transporting means including a suction-type gripper engageable with the film in the cassette while same is opened and displaceable for transferring the film between the cassette and the at least one clip, the jaws being displaceable into an open position with the front jaw positioned to flatly receive the film from the gripper;

deflector elements displaceable between a retracted position beneath the surface and an advanced position standing well clear of the surface, the at least one clip being operatively engageable with the deflector elements on displacement near the cassette for displacing the deflector elements into the retracted position; and spring means urging the deflector elements into the advanced position.

15. The combination defined in claim 1 wherein the stripping elements have rear ends turned away from the surface and the actuator means includes cams engageable with the stripping elements to displace same into the advanced position.

16. The combination defined in claim 1 wherein the actuator means pneumatically operates the stripping elements.

17. The combination defined in claim 1 wherein the stripping elements are formed by a flexible membrane and the actuator means displaces the stripping elements into the advanced position by applying fluid pressure behind the membrane.

18. An apparatus for handling an exposed x-ray film formed of a flexible sheet having a front face and a rear face, a layer of an x-ray stimulable phosphor on the front face, and a layer of a magnetically attractable material on the rear face, comprising:

structure forming a flat support surface of a size at least equal to that of the film;

at least one permanent magnet embedded in the structure and extending over the surface;

an array of stripping elements distributed over the surface and each displaceable through the surface between a recessed position below the surface and an advanced position projecting past the surface;

actuator means for selectively displacing the array of stripping elements between the two positions; and transporting means including at least one clip having jaws closable on the respective faces at an edge of the film and displaceable along the surface for moving the film on the projecting stripping elements into a predetermined position on the surface wherein the stripping elements are retracted and the rear face of the film magnetically adheres to the surface.

19. The apparatus as defined in claim 18, wherein the surface is inclined to the horizontal to place the film on the projecting stripping elements by the force of gravity.

20. The apparatus as defined in claim 19, wherein the surface forms an angle of about 110° to the horizontal.

21. The apparatus as defined in claim 19, further comprising a suction-type gripper engageable with the rear face of the film to move the film between the jaws of the at least one clip and a film cassette.

22. The apparatus as defined in claim 18, wherein the transporting means includes an endless driving belt carrying the at least one clip.

23. The apparatus as defined in claim 22, wherein the driving belt is a toothed belt engaging a toothed wheel driven by a motor.

24. The apparatus as defined in claim 22, wherein the at least one clip has a stationary rear jaw and a closeable front jaw, spring means for biasing the front jaw into an open position and pneumatically operated actuator for urging the front jaw against the rear jaw into the position gripping the edges of the film.

25. The apparatus as defined in claim 24, wherein the structure includes a support plate having a planar face forming the surface and provided with at least one permanent magnet, the plate being formed with a straight groove opening at the surface, the endless driving belt and the at least one clip being guided within the groove, the interface of the jaws of the at least one clip being at the level of the stripping elements in the advanced position thereof, and the rear jaw being formed with a forward edge inclined at a sharp acute angle to the surface and extending into the groove below the surface.

26. The apparatus as defined in claim 25, further comprising control means for moving the front jaw into its open position after the at least one clip has reached the predetermined position on the surface and the stripping elements have been displaced into their recessed position, and for moving on the at least one clip until the film is fully released.

27. The apparatus as defined in claim 26, wherein the control means reverses the movement of the driving belt, displaces the stripping elements into their advanced position to lift the film above the surface and as soon as the edge of the film is between the jaws, closing the front jaw to move the film on the stripping elements into its initial position.

28. The apparatus as defined in claim 27, including a suction type gripper wherein the front jaw in its open position forms with the stationary rear jaw an angle sufficient for allowing the suction type gripper to engage the edge of the rear face of the film on the front jaw.

29. The apparatus as defined in claim 28, further comprising a spring biased deflector element arranged in said groove at the initial position of the film and being displaceable between a retracted position beneath the surface and an advanced position extending above the surface to direct the rear face of the film against the suction type gripper, the at least one clip being operatively engageable with the deflector element on displacement near the initial position of the film for displacing the deflector element into its retracted position.

30. The apparatus as defined in claim 18, wherein the stripping elements are in the form of individual bars arranged in assigned openings in the structure and having rear surfaces formed with inclined camming edges engageable by camming tabs of a common actuator bar.

31. The apparatus as defined in claim 18, wherein pneumatic means actuate the stripping elements.

32. The apparatus as defined in claim 18, wherein the stripping elements are formed by a flexible membrane and the actuator means displaces the stripping elements into the advanced position by applying fluid pressure against the membrane.

* * * * *